United States Patent
Onomatsu et al.

(10) Patent No.: US 7,098,966 B2
(45) Date of Patent: Aug. 29, 2006

(54) DIGITAL TV RECEIVER

(75) Inventors: Takehiro Onomatsu, Osaka (JP); Yoshihisa Nagamura, Osaka (JP)

(73) Assignee: Funai Electric Co., Ltd., Daito (JP)

( * ) Notice: Subject to any disclaimer, the term of this patent is extended or adjusted under 35 U.S.C. 154(b) by 523 days.

(21) Appl. No.: 10/630,691

(22) Filed: Jul. 31, 2003

(65) Prior Publication Data
US 2004/0041952 A1    Mar. 4, 2004

(30) Foreign Application Priority Data
Aug. 27, 2002    (JP) .............................. 2002-247756

(51) Int. Cl.
*H04N 9/64* (2006.01)
*H04N 5/44* (2006.01)

(52) U.S. Cl. ..................... 348/714; 348/725; 348/553

(58) Field of Classification Search ................ 348/714, 348/716, 718–721, 552–554, 705, 706, 725, 348/731; H04N 5/44, 9/64
See application file for complete search history.

(56) References Cited

U.S. PATENT DOCUMENTS 6,525,775 B1 *    2/2003    Kahn et al. .................. 348/714

FOREIGN PATENT DOCUMENTS

| JP | 5-56052 | 8/1993 |
|---|---|---|
| JP | 07-219629 | 8/1995 |
| JP | 11-275609 | 10/1999 |
| JP | 11-289497 | 10/1999 |
| JP | 2000-165767 | 6/2000 |
| JP | 2000-347829 | 12/2000 |
| JP | 2001-103333 | 4/2001 |
| JP | 2002-014835 | 1/2002 |

* cited by examiner

*Primary Examiner*—Sherrie Hsia
(74) *Attorney, Agent, or Firm*—Crowell & Moring LLP

(57) ABSTRACT

In a manufacturing process in a factory or in a maintenance process in a service center, an initial control program or an updated control program is easily written in a digital TV receiver. The digital TV receiver has an IDE connector to which an external memory apparatus through an IDE cable. A main controller judges whether the external memory apparatus is connected or not with utilizing opening terminals of the IDE connector. When the external memory apparatus is connected, the control program is read out from the external memory apparatus, and written into a control program memory of the digital TV receiver or the existing control program is replaced with the updated control program. When the external memory apparatus is not connected, the existing control program is read out from the control program memory and the digital TV receiver is controlled corresponding to the control program.

13 Claims, 2 Drawing Sheets

DIGITAL TV RECEIVER

BACKGROUND OF THE INVENTION

1. Field of the Invention

This invention relates to a digital TV (television) receiver, and especially relates to writing of a control program of the digital TV receiver.

2. Description of the Related Art

In the digital TV receiver, it is proposed that the control program is written in a rewritable nonvolatile memory such as a flash memory and rewritten according to need for updating the control program corresponding to change of service level of the TV broadcast in the future or correcting the bug in the control program (see publication gazette of examined Japanese patent application 5-56052).

Furthermore, it is proposed that a digital equipment is connected to a network for receiving programmable signals from a server, so that the control program can be updated (see publication gazette of unexamined Japanese patent application 2002-14835).

Still furthermore, it is proposed that the updated control program is superimposed on and delivered with airwaves of the TV broadcast, and the receiver extracts the control program from received signals and updates the control program (see publication gazettes of unexamined Japanese patent applications 2001-103333 and 11-275609).

When the control program of the digital TV receiver is downloaded through the network, the transmission speed is slower even though the communication pathway is stable. Thus, it is not suitable for downloading the control program of the digital TV receiver having a capacity of several mega-byte. Furthermore, a host computer such as an external server for communicating the control program is needed.

When the control program of the digital TV receiver is downloaded through the airwaves, the communication pathway is unstable, so that there is a possibility to receive the interference due to the communication error. Thus, the reliability of the received control program is lower. Furthermore, the transmission speed is not so fast. Still furthermore, it needs not only the host computer such as the external server but also cooperation of TV stations. Therefore, such the update service of the control program of the digital TV receiver cannot be offered at all areas in the world.

Still furthermore, it is necessary to memorize two control programs before and after the update, temporarily, so that two sets of flash memories are necessary, which causes the increase of the cost of the digital TV receiver. Still furthermore, it is necessary to write an initial control program into the flash memory of the digital TV receiver in a manufacturing process in a factory by another method different from receiving the airwaves. Thus, the digital TV receiver is connected to a hard disc drive apparatus through a connector so as to be written the initial control program into the flash memory, the connector and interfaces, which are not used ordinarily, are necessary.

Still another method for reading the updated control program from a recording medium such as a CD-ROM or a DVD can be considered. It, however, needs a recording medium reader which is inherently unnecessary with respect to the digital TV receiver, so that the recording medium reader causes upsizing and increase of the cost of the digital TV receiver.

For writing the control program in the manufacturing process in the factory, it is considered that the control program is written into the flash memory through a port which is inherently used for debugging a heard ware of the digital TV receiver. It, however, needs an expensive and extraordinary apparatus such as an in-circuit emulator. Furthermore, it requires careful treatment for activating the system stably, since the flash memory is disposed at a delicate portion near to a CPU core and it can easily be affected by external noises.

SUMMARY OF THE INVENTION

An object of this invention is to provide a digital TV receiver in which the control program can easily be written or updated with using no recording medium reader.

A digital TV receiver in accordance with an aspect of the present invention comprises a tuner which receives digital broadcast signals delivered from TV stations, a decoder for decoding the received digital broadcast signals, an output device for outputting the decoded digital broadcast signals to a monitor display apparatus, a memory for memorizing at least a control program, a main controller for controlling the digital TV receiver corresponding to the control program, and a connection device to which an external memory apparatus memorizing a control program can be connected. The connection device includes an IDE connector to which an IDE cable connected to the external memory apparatus is connected. When the external memory apparatus is connected to the connection device, the main controller accesses the external memory apparatus for reading out the control program, and writes the readout control program into the memory or updates an existing control program memorized in the memory with the readout control program.

By such a configuration, when the external memory apparatus is connected to the connection device through the IDE cable in a manufacturing process in a factory, an initial control program memorized in the external memory apparatus is automatically written into the memory of the digital TV receiver. Alternatively, when the external memory apparatus is connected to the connection device through the IDE cable, for example, in a maintenance process in a service center, an updated control program is written into the memory of the digital TV receiver, and the existing control program memorized in the memory is replaced with the updated control program.

In comparison with SCSI (small computer system interface) standard, the IDE (integrated device electronics) standard has disadvantages that a number of apparatuses connectable to the IDE interface is small and the data transmission speed is slow. The IDE connector and IDE cable, however, has advantages that they are inexpensive and need no exclusive circuit board such as a SCSI board. Thus, the configuration of the circuit board of the digital TV receiver can be made simple. With respect to the data transmission speed, the IDE has sufficient performance in practical use for writing the control program.

DETAILED DESCRIPTION OF THE EMBODIMENT

A digital TV receiver in accordance with an embodiment of the present invention is described with reference to the figures. The digital TV receiver in this embodiment is suitable for products shipped to an area where the updated control program cannot be superimposed on and transmitted with the airwaves of the TV broadcast such as the ATSC standard products to the United States.

Figure 1:
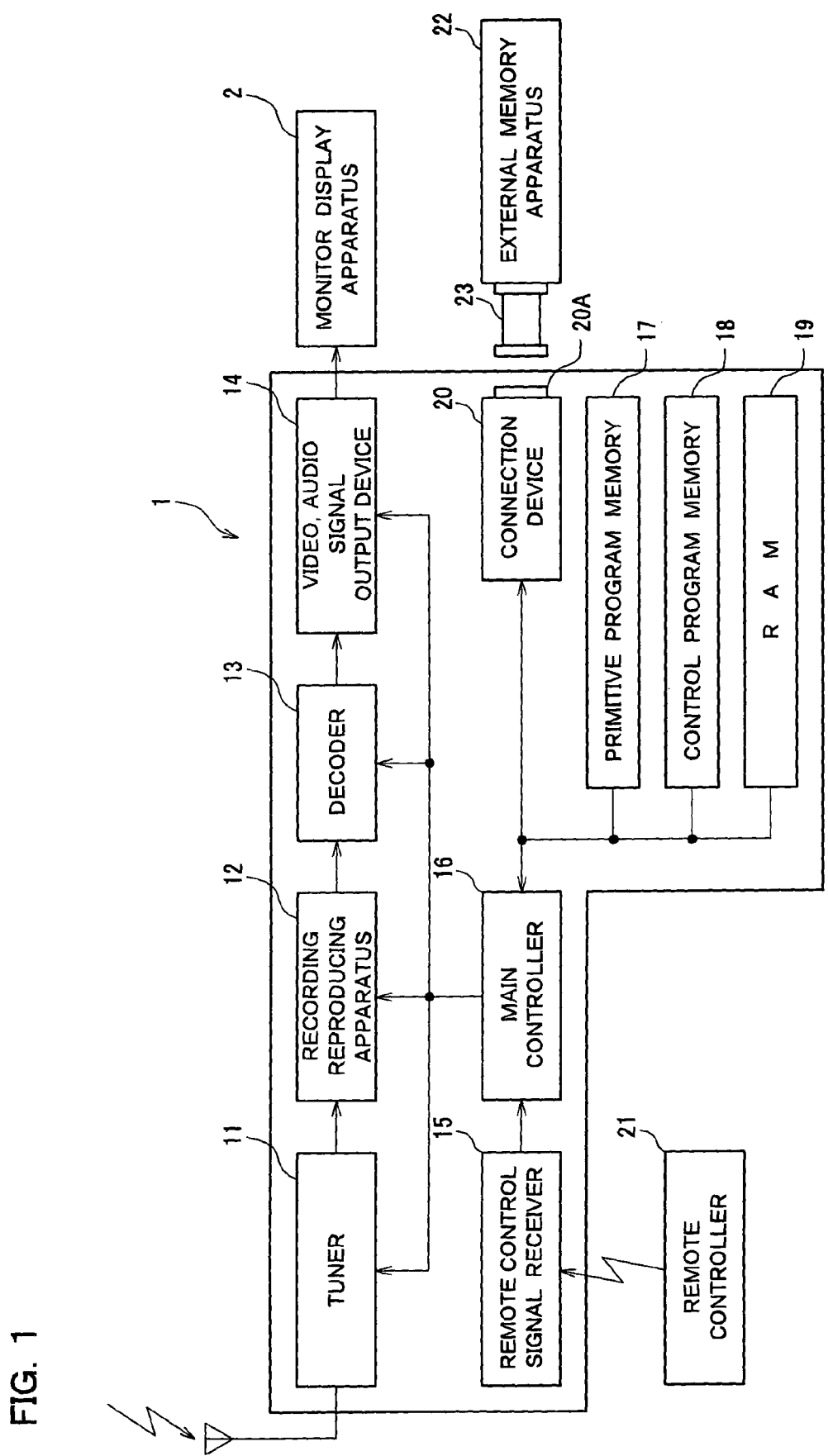
FIG. 1 is a block diagram for showing a configuration of a digital TV receiver in accordance with an embodiment of the present invention.

A block diagram of the digital TV receiver in this embodiment is shown in FIG. 1. The digital TV receiver 1 receives airwaves of digital broadcast signals delivered from TV stations, stores the broadcast signals, for example, of TV programs extracted from the airwaves, and outputs a video picture on a monitor display apparatus 2 by reproducing the stored broadcast signals of the TV programs.

As shown in FIG. 1, the digital TV receiver 1 is constituted by the following elements. A tuner 11 connected to an antenna receives airwaves of digital broadcast signals delivered from TV stations and demodulates the broadcast signals from the airwaves. A recording and reproducing apparatus 12 such as a hard disc drive apparatus stores the broadcast signals outputted from the tuner 11, temporarily. A decoder 13 extracts a video data, an audio data and other attached data from the broadcast signals temporarily stored in the recording and reproducing apparatus 12 and decodes the extracted data independently. A video and audio signal output device 14 outputs the video signal and the audio signal decoded by the decoder 13 to the monitor display apparatus 2. A remote control signal receiver 15 for receiving control signals of operation command outputted from a remote controller 21 such as a channel changer operated by a user. A main controller 16 such as a CPU (central processing unit) controls whole functions of the digital TV receiver 1 corresponding to a primitive program and a control program which will be described below. A primitive program memory 17 for memorizing the primitive program is constituted by a nonvolatile memory such as a mask ROM (read only memory). A control program memory 18 for memorizing the control program is constituted by rewritable nonvolatile memory such as a flash memory. A RAM (random access memory) 19 temporarily memorizes the control program readout from the control program memory 18, control data, and so on. A connection device 20 comprises an IDE (integrated device electronics) connector 20A and can be connected to an external memory apparatus 22 such as a hard disc drive apparatus through an IDE cable 23. The primitive program memory 17 and the control program memory 18, however, can be provided in the same rewritable nonvolatile memory such as the flash memory.

The primitive program is activated just after switching on of electric power supply of the digital TV receiver 1. In this embodiment, the primitive program has the following two functions. First function is a "normal startup" function executed when the electric power supply is switched on at a user site. In the normal startup function, the control program is readout from the control program memory 18 and loaded on the RAM 19, the digital broadcast signals are received corresponding to the control program, and the broadcast signals are reproduced as a video picture on the monitor display apparatus 2. Second function is a "control program writing" function for writing an initial control program in the control program memory 18 in a manufacturing process of a factory, and for updating the control program of the digital TV receiver at a user site or at a service center.

Since the control program executes not only primitive function such as selection of channel of TV station or setting of timer but also advanced function such as two-way communication, it is desired to update the control program as needed corresponding to change or upgrading of service level of digital broadcast.

The external memory apparatus 22 is, for example, a hard disc drive apparatus prepared on a manufacturing line in a factory or in a service center, which memorizes the initial or updated control program at a predetermined address. The external memory apparatus 22, especially, comprises an IDE interface, which is to be connected to the IDE connector 20A of the connection device 20 of the digital TV receiver 1 through the IDE cable 23.

As is generally known, the IDE is an interface used for connecting a built-in hard disc drive apparatus of a personal computer, and the IDE connector is directly mounted on a circuit board such as a mother board. In this embodiment, the external memory apparatus 22 is not connected to the digital TV receiver 1 in a normal state when the user uses the digital TV receiver 1 for receiving the digital broadcast signals. Thus, the IDE connector 20A is, for example, provided on a circuit board (not shown) of the digital TV receiver 1, and the IDE cable 23 is connected to the IDE connector 20A while a cover of the digital TV receiver 1 is removed.

Even though a plurality of terminals are provided in an IDE connector, there are opening terminals which are not used for transmitting and receiving signals between the connection device 20 and the external memory apparatus 22. In this embodiment, predetermined terminals among the opening terminals of the IDE connector 20A of the connection device 20 are used for judging whether the IDE cable 23 is connected to the IDE connector 20A or not, or whether the external memory apparatus 20 can be accessed through the IDE cable 23 or not. For example, a voltage at a predetermined opening terminal of the IDE connector 20A is to be decreased less than a predetermined threshold value when the IDE cable 23 is connected thereto. The control program is programmed so that the main controller 16 senses the voltage at the predetermined terminal just after switching on of the power supply.

When the IDE cable 23 connected to the external memory apparatus 22 is further connected to the IDE connector 20A of the connection device 20, the external memory apparatus 20 is substantially equivalent to the built-in hard disc drive apparatus connected to the main controller 16. The primitive program, which is activated just after the switching on of the power supply, is programmed in a manner so that the main controller 16 accesses the external memory apparatus 22 for reading out the control program memorized at a predetermined address, and writing the control program into the control program memory 18. Thus, the control program is automatically written in the control program memory 18.

Since the IDE connector and the IDE cable are primitively used for connecting the built-in hard disc drive apparatus to the mother board, they are not designed for repeating the engaging and disengaging with each other, frequently. The control program, however, are not written or updated frequently, and the writing or update of the control program is treated by skilled engineer. Thus, it is no problem that the IDE connector 20A and the IDE cable 23 are used for connecting the external memory apparatus 22 and the connection device 20 of the digital TV receiver 1.

The IDE interface has generally disadvantages that a number of apparatuses connectable to the IDE interface is small and the data transmission speed is slow. These disadvantages, however, cause no trouble while the control program is updated, since it is intended that the IDE interface is used for connecting a particular digital TV receiver 1 and the external memory apparatus 22. When the initial control program is written in a plurality of digital TV receivers 1 in the manufacturing process in the factory, the smallness of the number of apparatuses connectable to the IDE interface can be solved by providing a predetermined number of the external memory apparatuses 22 as required. The slowness of the data transmitting speed causes no problem, since the control program occupies a capacity of several mega-bytes. On the other hand, when it is assumed that SCSI (small computer system interface) is used for connecting the circuit board of the digital TV receiver 1 and the external memory apparatus 22, it needs an exclusive SCSI board, and so on. In comparison with the case of using the SCSI, the use of the IDE interface has advantages that the configuration of the circuit can be made simple and the cost of the circuit board can be reduced.

Figure 2:
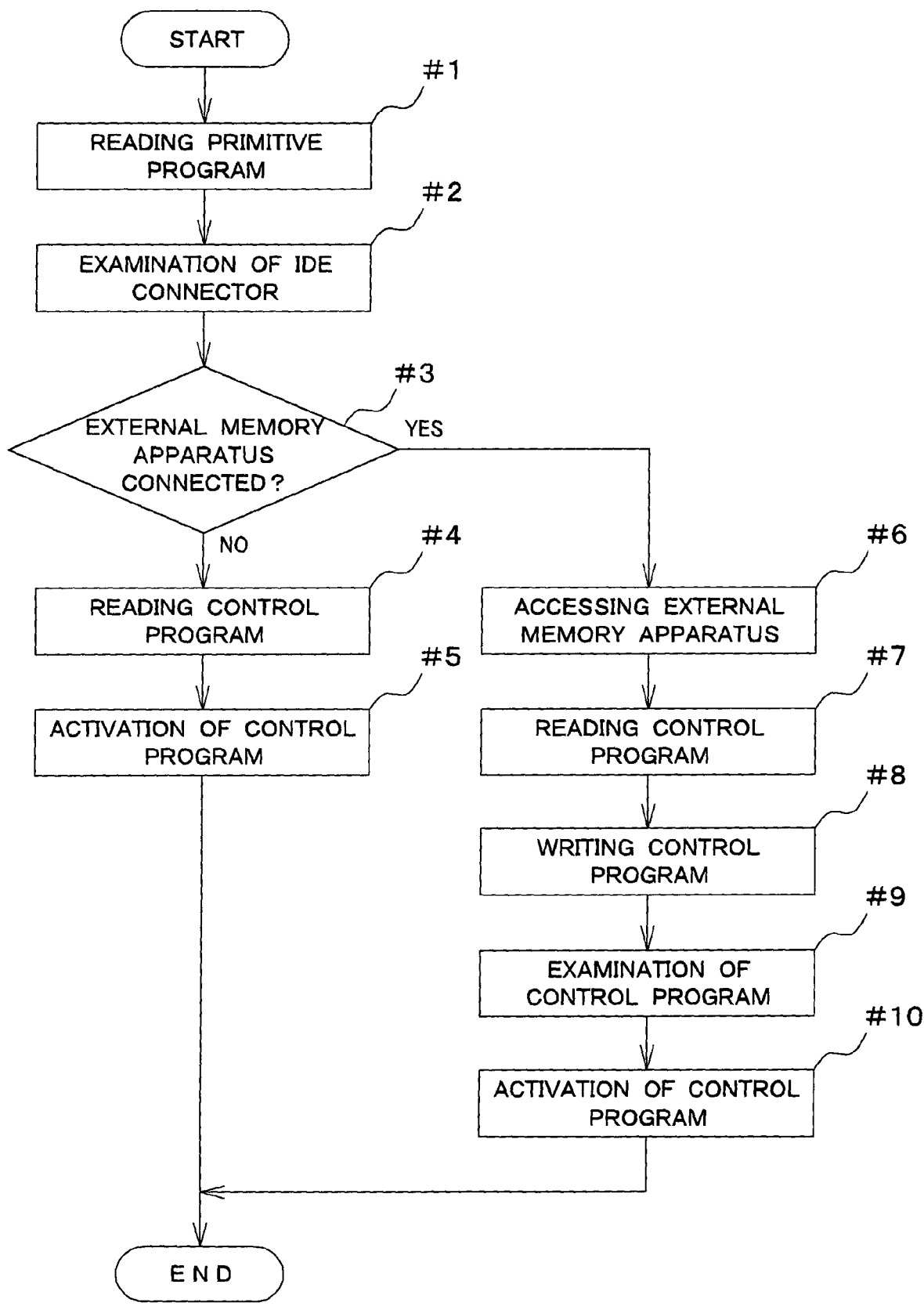
FIG. 2 is a flowchart for showing an operation of the digital TV receiver just after switching on of an electric power in the embodiment.

Subsequently, the operation of the digital TV receiver 1 just after switching on of the power supply is described with reference to a flowchart shown in FIG. 2.

When a power switch of the digital TV receiver 1 is switched on, the main controller 16 accesses the primitive program memory 17 for reading out the primitive memory memorized in the primitive program memory 17 (#1). Subsequently, the main controller 16 controls whole of the digital TV receiver 1 corresponding to the primitive program. When the primitive program is activated, the main controller 16 senses the voltage of the predetermined opening terminal among the terminals of the IDE connector 20A of the connection device 20 (#2). Since the voltage at the predetermined opening terminal of the IDE connector 20A is decreased less than the predetermined threshold value when the IDE cable 23 is connected to the IDE connector 20A, as mentioned above, the main controller 16 can judge whether the external memory apparatus 22 is connected to the connection device 20 or not corresponding to the voltage of the predetermined opening terminal is higher or lower than the threshold value (#3).

When the main controller 16 judges that the external memory apparatus 22 is not connected to the connection device 20 in step #3, the main controller 16 reads out the control program memorized in the control program memory 18 (#4), and writes the control program into the RAM 19. Thus, the control program is activated, so that the whole of the digital TV receiver 1 is controlled corresponding to the control program (#5). As a result, the digital TV broadcast can be received, normally.

Alternatively, when the main controller 16 judges that the external memory apparatus 22 is connected to the connection device 20 in step #3, it is alternative of the writing of the initial control program in the manufacturing process in the factory and the update of the control program in the service center, or the like. Thus, the main controller 16 accesses the external memory apparatus 22 corresponding to the primitive program (#6), and reads out the control program memorized at the predetermined address in the external memory apparatus 22 (#7). Subsequently, the main controller 16 writes the control program into the control program memory 18 directly of after storing the control program into the RAM 19 (#8).

Subsequently, the main controller 16 examines whether the control program is correctly written or not by comparing the control program written in the control program memory 18 with the control program readout from the external memory apparatus 22 (#9). When the control program is correctly written, the main controller 16 reads out the control program newly written in the control program memory 18 and activates the control program for operation test (#10). The main controller 16 examines whether the digital TV receiver 1 is normally functionated corresponding to the control program newly written.

When the control program is updated, the existing control program before the update is memorized in the control program memory 18. Thus, it is possible that the updated control program readout from the external memory apparatus 22 is once stored into the RAM 19 in step #8, and the updated control program is written in the control program memory 18 after erasing the existing control program before the update. Alternatively, it is possible that the updated control program is compared with the existing control program before the update, and only the modified portions in the control program are updated.

As mentioned above, the digital TV receiver 1 comprises the connection device 20 with the IDE connector 20A to which the external memory apparatus 22 can be connected through the IDE cable 23. When the power switch of the digital TV receiver is switched on under connecting the external memory apparatus 22 with the connection device 20 of the digital TV receiver 1, the main controller 16 accesses the external memory apparatus 22 for reading out the control program memorized in the external memory apparatus 22 corresponding to the primitive program which is activated just after switching on of the power supply of the digital TV receiver. In the manufacturing process in the factory, the initial control program can be written into the control program memory 18, automatically. In the maintenance process at a service center or at a user site, the existing control program memorized in the control program memory 18 can be replaced with the updated control program memorized in the external memory apparatus, automatically. Thus, the service engineer can easily update the control program memorized in the control program memory 18 in the digital TV receiver 1 without operating particular procedures. The update of the control program of the digital TV receiver 1 can be updated at the user site, since the external memory apparatus 22 can be constituted as portable which can be carried with repair tools.

In the above-mentioned embodiment is described on the assumption that the products are shipped to the area where the service for updating the control program via the airwaves is not offered, and the digital TV receiver has no recording medium reader. Since the present invention, however, is not restricted by the description of the embodiment, it is possible to apply the present invention into the products shipped to the area where the service for updating the control program via the airwaves is offered, or the digital TV receiver having a recording medium reader. In the latter products, the control program is written in the flash memory and so on in the manufacturing process in the factory, so that the present invention is effective in such the case.

This application is based on Japanese patent application 2002-247756 filed in Japan, the contents of which are hereby incorporated by references.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A digital TV receiver comprising: a tuner which receives digital broadcast signals delivered from TV stations; a decoder for decoding the received digital broadcast signals; an output device for outputting the decoded digital broadcast signals to a monitor display apparatus; a memory for memorizing at least a primitive program and a control program; a main controller for controlling the digital TV receiver corresponding to the control program; and a connection device to which an external memory apparatus memorizing a control program can be connected; wherein
the connection device includes an IDE connector to which an IDE cable connected to the external memory apparatus is connected;
when the external memory apparatus is connected to the connection device, the main controller accesses the external memory apparatus for reading out the control program, and writes the readout control program into the memory or updates an existing control program memorized in the memory with the readout control program.

2. The digital TV receiver in accordance with claim 1, wherein
the main controller judges whether the external memory apparatus is connected to the connection device or not just after switching on of a power supply of the digital TV receiver.

3. The digital TV receiver in accordance with claim 1, wherein
the main controller judges whether the external memory apparatus is connected to the connection device or not by utilizing opening terminals of the IDE connector which are not used for transmitting and receiving signals.

4. The digital TV receiver in accordance with claim 1, wherein
the memory further memorizes a primitive program which is activated just after switching on of the power supply of the digital TV receiver, and
the main controller judges whether the external memory apparatus is connected to the connection device or not corresponding to the primitive program.

5. The digital TV receiver in accordance with claim 1, wherein
when the existing control program is memorized in the memory, the control program readout from the external memory apparatus is written in the memory after erasing the existing control program.

6. The digital TV receiver in accordance with claim 1, wherein
when the existing control program is memorized in the memory, the control program readout from the external memory is compared with the existing control program before the update, and only modified portions in the control program are updated.

7. The digital TV receiver in accordance with claim 1, wherein
when the main controller judges that the external memory apparatus is not connected, the main controller reads out the control program from the memory, and activates the control program for controlling whole of the digital TV receiver corresponding to the control program.

8. The digital TV receiver in accordance with claim 1, wherein
at least a portion of the memory for memorizing the control program is a rewritable nonvolatile memory.

9. A digital TV receiver comprising: a tuner for receiving digital broadcast signals which are encoded, compressed and delivered by TV stations; a decoder for decoding the broadcast signals received by the tuner; an output device for outputting the encoded broadcast signals to an image display apparatus; a control program memory of a rewritable nonvolatile memory for memorizing a control program by which whole of the digital TV receiver is controlled; a primitive program memory of a nonvolatile memory for memorizing a primitive program which is activated just after switching on of a power supply of the digital TV receiver; and a main controller for controlling whole of the digital TV receiver corresponding to the primitive program or the control program; wherein
a connection device including an IDE connector, to which an external memory apparatus memorizing a control program is connected through an IDE cable, is further provided;
the main controller judges whether the external memory apparatus is connected to the connection device or not corresponding to the primitive program just after switching on of the power supply with utilizing opening terminals of the IDE connector which are not used for transmitting and receiving signals between the connection device and the external memory apparatus;
when the main controller judges that the external memory apparatus is connected to the connection device, the main controller accesses the external memory apparatus for reading out the control program memorized at a predetermined address in the external memory apparatus, and writes the readout control program or updates an existing control program memorized in the control program memory with the readout control program corresponding to the primitive program; and
when the main controller judges that the external memory apparatus is not connected to the connection device, the main controller reads out the existing control program memorized in the control program memory corresponding to the primitive program, and controls whole the digital TV receiver corresponding to the control program.

10. The digital TV receiver in accordance with claim 9, wherein
when the existing control program is memorized in the control program memory, the control program readout from the external memory apparatus is written in the control program memory after erasing the existing control program.

11. The digital TV receiver in accordance with claim 9, wherein
when the existing control program is memorized in the control program memory, the control program readout from the external memory is compared with the existing control program before the update, and only modified portions in the control program are updated.

12. The digital TV receiver in accordance with claim 9, wherein
when the main controller judges that the external memory apparatus in not connected, the main controller reads out the control program from the control program memory, and activates the control program for controlling whole of the digital TV receiver corresponding to the control program.

13. The digital TV receiver in accordance with claim 9, wherein
at least a portion of the control program memory for memorizing the control program is a rewritable nonvolatile memory.

* * * * *